S. MUNSON.

BOLT LOCK.

APPLICATION FILED DEC. 24, 1920.

Reissued Dec. 13, 1921. 15,246.

Inventor

Sweney Munson,

By

Geo. P. Kimmel. Attorney

UNITED STATES PATENT OFFICE.

SWENEY MUNSON, OF SCAMMON, KANSAS.

BOLT-LOCK.

15,246. Specification of Reissued Letters Patent. Reissued Dec. 13, 1921.

Original No. 1,346,907, dated July 20, 1920, Serial No. 271,589, filed January 17, 1919. Application for reissue filed December 24, 1920. Serial No. 433,055.

*To all whom it may concern:*

Be it known that I, SWENEY MUNSON, a citizen of the United States, residing at Scammon, in the county of Cherokee and State of Kansas, have invented certain new and useful Improvements in Bolt-Locks, of which the following is a specification.

My invention relates to improvements in bolt-locks.

It is particularly adapted for locking tap bolts to hold them from turning and is adapted for use in connection with a bolt having a head.

My invention provides a locking member which is adapted to embrace the bolt head and to engage a portion formed with and offset from the surface of the member against which the bolt head bears to hold said bolt from rotation. My invention further provides means associated with the locking member for holding said locking member from longitudinal movement on the bolt head.

My invention is particularly well adapted for use in connection with devices embodying two members, through one of which the bolt extends and with the other of which members the bolt has screw-threaded engagement.

The novel features of my invention are hereinafter fully described and claimed.

In the accompanying drawing, which illustrates my invention,

Similar reference characters designate similar parts in the different views.

Figure 1:
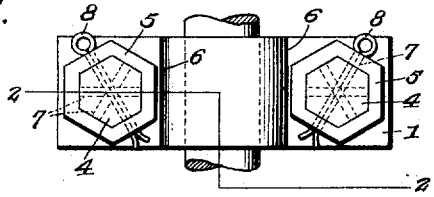
Figure 1 is a plan view of my invention shown applied to an ordinary shaft bearing.
Figure 2:
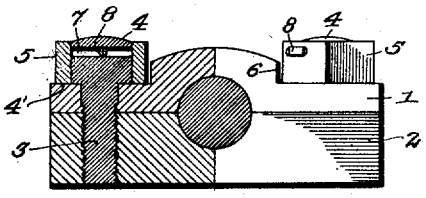
Fig. 2 is a vertical sectional view on the line 2—2 of Fig. 1.
Figure 4:
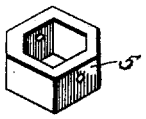
Fig. 4 is a perspective view of a hexagonal collar adapted for use in connection with the bolts which have hexagonal heads.
Figure 5:
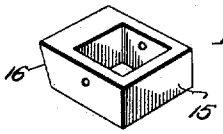
Fig. 5 is a perspective view of a square collar adapted for use on a square headed bolt, such as is shown in Fig. 3.
Figure 6:
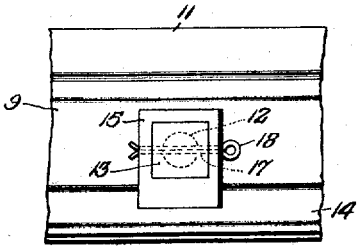
Fig. 6 is a fragmentary side elevation of Fig. 3.

Referring first to Figs. 1 and 2, 1 designates the cap and 2 the base of an ordinary box or shaft bearing. 3 designates the screw-threaded shank of an ordinary tap bolt, one of which is employed at each side of the bearing. Each tap bolt has its threaded shank engaging threaded openings in the parts 1 and 2. Each bolt is formed with a preferably fixed head 4, of hexagonal or other suitable form, which bears against the plane, wholly superficial upper abutment surface 4′ of the cap 1. Fitted on the head 4 is a collar 5, of hexagonal or other suitable angular form, a portion or one of the sides of which is disposed between the bolt head and a shoulder, raised portion or like surface 6 formed on the cap 1 and projected beyond the plane of the said wholly superficial abutment surface 4′. Such portion or side of the collar 5, lying between the head 4 and surface 6, is arranged for contact with the latter so as to hold the collar from turning, thereby holding the bolt on which the collar is fitted from turning.

Suitable means are provided for holding the collar 5 from longitudinal movement on and from slipping off from the bolt head 4. In Figs. 1 and 2, I have shown each bolt head 4 provided with one or more transverse holes 7, through one of which may be extended a suitable locking pin, such as a cotter pin 8, which may also be extended through the adjacent collar 5.

In the operation of my invention, as shown in Figs. 1 and 2, the bolts 3 are extended through the cap 1 and screwed into the base 2 so as to have the heads 4 bear tightly against the upper abutment surface of the cap 1. The bolts are turned until one side of each bolt is disposed parallel with the adjacent shoulder 6. The collars 5 are then slipped onto the bolt head 4 respectively, the thickness of the collar being such as will permit it to slip between the bolt head and the adjacent shoulder 6 and such as will cause it to contact with the shoulder 6 so as to hold the collar from turning. The cotter pins 8 are then extended respectively through the collars 5 and the adjacent bolt heads 4.

Figure 3:
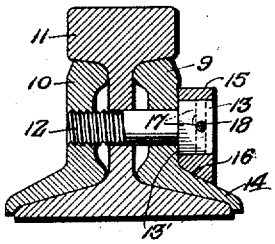
Fig. 3 is a vertical sectional view of a rail joint provided with my improvement.

In the form of my invention shown in Fig. 3, 9 and 10 designate respectively two angle plates, between which is clamped a rail, in the manner usual in rail joints.

12 designates the screw-threaded shank of a bolt which extends horizontally through the angle plates 9 and 10 and the web of the rail 11, the threaded end of the bolt being fitted in the screw-threaded hole provided in the angle plate 10.

The head 13 of the bolt 12 is square or of other suitable form and bears against the outer wholly superficial plane abutment face or side 13′ of the angle plate 9. The latter is provided with a portion projected beyond the plane of said abutment face and comprising a longitudinal flange 14 which bears in the usual manner upon the adjacent upper side of the base of the rail. Fitted on the square head 13 of the bolt is a locking member, preferably comprising a collar 15 having a beveled side 16 which bears against the flange 14 and holds the collar from turning relatively to the angle plate 9. The collar 15 thus holds the bolt from turning.

The head 13 of the bolt is provided with one or more transverse holes 17, through one of which and through the collar 15 extends a suitable locking device, such as a cotter pin 18. The cotter pin 18 holds the collar 15 from longitudinal movement on the head 13.

The angle plates 9 and 10 having been clamped in the usual manner to the rail 11 by the bolt 12, the collar 15 is slipped onto the head 13 of the bolt, with the beveled edge 16 of the collar resting against the flange 14. The cotter pin 18 is then extended through the collar 15 and bolt head 13, in which position it is held in the usual manner by having its ends bent laterally in opposite directions at the outer side of the collar.

It will be noted that the collars 5 and 15 embrace only the sides of the head of the bolt. This permits the employment of a bolt having any length of head without changing the length of the collar, as the head of the bolt can be slid through the collar.

I do not limit my invention to the structures shown and described, as many modifications, within the scope of the appended claims, may be made without departing from the spirit of my invention.

What I claim is:—

1. In a bolt lock, the combination with an angle plate, of a bolt extending through one flange of said plate and having a head other than circular bearing against said flange, a collar embracing and fitted to the sides only of said bolt head and at one side having a bearing against the other flange of said plate, the other side of the collar being clear of said plate, and a pin insertible through and removable from the collar and the head of said bolt while the collar is in the locked position, substantially as set forth.

2. A lock device for a fastener having a head provided with radial intersecting transverse openings, comprising a collar like element shaped to peripherally embrace said head when projected beyond a piece of working surface and when applied thereto adapted to laterally abut an adjacent part of the surface secured by the fastener to prevent turning of the head, and means positively engaged in the collar and any one of the openings in the head to prevent displacement of said collar and head relative to each other.

In testimony whereof I affix my signature.

SWENEY MUNSON.